United States Patent Office 3,362,931
Patented Jan. 9, 1968

3,362,931
CALKING COMPOSITION COMPRISING LIQUID CARBOXY TERMINATED CONJUGATED DIENE POLYMERS AND BORON NITRIDE
Gerard Kraus and Jerry T. Gruver, Bartlesville, Okla., assignors to Phillips Petroleum Company, a corporation of Delaware
No Drawing. Filed May 20, 1963, Ser. No. 281,775
7 Claims. (Cl. 260—41.5)

This invention relates to calking compositions and methods of calking. In one aspect the invention relates to calking compositions comprising carboxy terminated diene polymers. In another aspect the invention relates to combining a liquid carboxy terminated diene polymer with a basic reacting metal oxide to provide a thixotropic calking compound. In yet another aspect the invention relates to sealing an opening or joint with a permanently resilient seal. In another aspect the invention relates to the utilization of a liquid telechelic polymer in a calking compound. In a still further aspect the invention relates to the utilization of a liquid plasticizer with a liquid telechelic polymer to produce novel polymers having improved characteristics.

Calking compounds of various types and compositions have long been known and widely used in the arts. These materials are soft, fairly viscous substances which can be applied with a gun or knife to joints as sealants therefor, which are adhesive to various materials, and which harden with the passage of time. Typical of such compositions is glazier's putty, generally made by mixing calcium carbonate (whiting) with a drying oil such as boiled linseed oil. In compositions of this type the drying oil component sets up as a result of the oxidation effect of air and is thus the actual sealing agent, the mineral filler giving body thereto and being held in place by the dried oil. Since there is little, if any, interaction between the drying oil and the filler, such compositions often fail when applied to surfaces which absorb the oil therefrom. It has also been observed that some conventional sealants, if prepared in a consistency suitable for convenient application with for example, a calking gun, tend to flow from vertical joints, thus leading to imperfect seals and/or unsightly joints.

In accordance with one aspect of the invention we have now discovered that compositions comprising a liquid telechelic polymer and a filler are useful as calking compounds. These compositions harden on the outside when exposed to the air, thereby providing a surface which does not pick up dust from the atmosphere and which can be painted along with adjacent structures when desired. Beneath the surface the compositions remain resilient, thereby adjusting to vibration, thermal expansion, or other structural variation without cracking or pulling away from underlying surfaces. In accordance with another aspect of the invention we have discovered new compositions which are particularly suited for calking operations comprising a liquid carboxy-terminated diene polymer in which is incorporated a basic reacting metal oxide. These latter compositions are characterized by the interaction of the metal oxide with the terminal carboxy groups of the polymer, thereby providing an integrated mass which is highly thixotropic, thus eliminating flow of the composition in the joint regardless of its position and still not preventing its being readily applied with gun or knife. Because of the polarity of the carboxy groups present, these novel compositions adhere strongly to metal substrates, rendering them particularly applicable for use in calking metal joints. Since the basic reacting metal oxides are chemically bound to the polymer component, separation by absorption of liquid in wood or other similar substrate is prevented, thus avoiding failure of the seal by loss of binder. In accordance with a further aspect of the invention we have discovered that a liquid plasticizer can be utilized with a liquid telechelic polymer in the production of calking compounds having improved characteristics.

Accordingly, it is an object of the invention to provide novel calking compounds. Another object of the invention is to provide a highly thixotropic compound to eliminate the flow of the compound when applied to a joint regardless of the position of the joint. Another object of the invention is to provide a calking compound which is readily applied with a gun or knife. Still another object of the invention is to provide a compound the surface of which hardens when exposed to air, and the interior of which remains resilient. Yet another object of the invention is to provide a composition suitable for calking metal joints. A further object of the invention is to prevent the failure of a calking seal due to loss of binder. Another object of the invention is to provide improved methods of calking joints.

Other aspects, objects and advantages will be apparent from a study of the disclosure and the appended claims.

The term "telechelic" has been coined to define terminally reactive polymers. As used in this application, telechelic polymer means a polymer of at least one vinylidene-containing monomer, terminated by at least one reactive group. The polymer can be a homopolymer of a conjugated diene, a copolymer of two or more conjugated dienes, or a copolymer of a conjugated diene with a minor amount of a monomer copolymerizable therewith such as the vinyl-substituted aromatic compounds and certain polar monomers. The preferred monomers are the conjugated dienes containing from 4 to 12 carbon atoms and preferably 4 to 8 carbon atoms, such as 1,3-butadiene, isoprene, piperylene, methylpentadiene, 2 - methyl - 1,3 -hexadiene, phenylbutadiene, 3,4 - dimethyl - 1,3 - hexadiene, 4,5 - diethyl - 1,3 - octadiene, etc. In addition, conjugated dienes containing reactive substituents along the chain can also be employed, such as for example, halogenated dienes, such as chloroprene, fluoroprene, etc. Of the conjugated dienes the preferred material is butadiene, isoprene and piperylene also being especially suitable.

The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents other than the vinyl group is generally not greater than 12. Examples of these aromatic monomers include: 3-methylstyrene, 3,5 - diethylstyrene, 4 - n - propylstyrene, 2,4,6 - trimethylstyrene, 4 - dodecylstyrene, 3 - methyl - 5 - n - hexylstyrene, 4 - cyclohexylstyrene, 4 - phenylstyrene, 2 - ethyl -4 - benzylstyrene, 4 - p - tolylstyrene, 3,5 - diphenylstyrene, 2,4,6 - tritert-butylstyrene, 2,3,4,5 - tetramethylstyrene, 4 - (4 - phenyl - n - butyl)styrene, 3 - (4 - n - hexylphenyl)- styrene, 4 - methoxystyrene, 3,5 - diphenoxystyrene, 3 - decoxystyrene, 2,6 - dimethyl - 4 - hexoxystyrene, 4 - dimethylaminostyrene, 3,5 - diethylaminostyrene, 4 - methoxy - 6 - di - n - propylaminostyrene, 4,5 - dimethyl - 1 - vinylnaphthalene, 3 - ethyl - 1 - vinylnaphthalene, 6 - isopropyl - 1 - vinylnaphthalene, 2,4 - diisopropyl - 1 - vinylnaphthalene, 3,6 - di - p - tolyl - 1 - vinylnaphthalene, 6 - cyclohexyl - 1 - vinylnaphthalene, 4,5 - diethyl - 8 - octyl - 1 - vinylnaphthalene, 3,4,5,6 - tetramethyl - 1 vinylnaphthalene, 3,6 - di - n - hexyl - 1 - vinylnaphthalene, 8 - phenyl - 1 - vinylnaphthalene, 5 - (2,4,6-trimethylphenyl)-1 - vinylnaphthalene, 3,6 - diethyl - 2 - vinylnaphthalene, 7 - dodecyl - 2 - vinylnaphthalene, 4 - n - propyl - 5 - n - butyl - 2 - vinylnaphthalene, 6 - benzyl - 2 - vinylnaphthalene, 3 - methyl - 5,6 - diethyl - 8 - n - propyl - 2 - vinylnaphthalene, 4 - o - tolyl - 2 - vinylnaphthalene, 5 - (3 - phenyl - n - propyl)2 - vinylnaphthalene, 4 - methoxy - 1 - vinylnaphthalene, 6 - phenoxy - 1 - vinylnaphthalene, 3,6 - dimethylamino - 1 - vinylnaphthalene, 7 - dihexoxy - 2 - vinylnaphthalene, and the like.

The polar monomers include vinylpyridines and vinylquinolines in which the vinyl group is attached to a ring carbon other than a carbon in the beta position with respect to the nitrogen. These pyridines, quinolines or isoquinoline derivatives can contain substituents such as alkyl, cycloalkyl, aryl, alkaryl, aralkyl, alkoxy, aryloxy and dialkylamino groups in which the total number of carbon atoms in the combined substituents other than the vinyl group does not exceed 12. Any alkyl groups on the alpha or gamma carbons with respect to the nitrogen should be tertiary alkyl groups. Examples of polar monomers applicable include:

2-vinylpyridine,
4-vinylpyridine,
3,5-diethyl-4-vinylpyridine,
5-methyl-2-vinylpyridine,
5-n-octyl-2-vinylpyridine,
3-n-dodecyl-2-vinylpyridine,
3,5-di-n-hexyl-4-vinylpyridine,
5-cyclohexyl-2-vinylpyridine,
4-phenyl-2-vinylpyridine,
3,5-di-tert-butyl-2-vinylpyridine,
3-benzyl-4-vinylpyridine,
6-methoxy-2-vinylpyridine,
4-phenoxy-2-vinylpyridine,
4-dimethylamino-2-vinylpyridine,
3,5-dimethyl-4-diamylamino-2-vinylpyridine,
2-vinylquinoline,
4-vinylquinoline,
2-tert-butyl-4-vinylquinoline,
3-methyl-4-vinylquinoline,
3-cyclohexyl-4-vinylquinoline,
3-methyl-4-ethoxy-2-vinylquinoline,
1-vinylisoquinoline,
3-vinylisoquinoline,
4-tert-dodecyl-1-vinylisoquinoline,
3-dimethylamino-3-vinylisoquinoline,
4-benzyl-3-vinylisoquinoline,
4-phenyl-1-vinylisoquinoline, and the like.

Other polar monomers include polymerizable nitriles and N,N-disubstituted amides, such as acrylonitrile, methacrylonitrile, N,N-dimethylacrylamide, N,N-diethylmethylacrylamide, and the like. Vinylfuran and N-vinylcarbazole can also be used.

In the preparation of the copolymers, the diene monomer will comprise at least 50 percent of the charge, preferably 70 percent or more, and polymerization conditions will be controlled in a manner such that liquid polymers are obtained.

The liquid diene polymers can be prepared by contacting the monomer or monomers which it is desired to polymerize with an organo alkali metal compound. The organo alkali metal compounds will contain from 1 to 4 alkali metal atoms, and those containing 2 alkali metal atoms are more often employed. As will be explained hereinafter, lithium is the preferred alkali metal.

The organo alkali metal compound can be prepared in several ways, for example, by replacing halogens in an organic halide with alkali metals, by direct addition of alkali metals to a double bond, or by reacting an organic halide with a suitable alkali metal compound.

The organo alkali metal compound initiates the polymerization reaction, the organo radical being incorporated in the polymer chain and alkali metal attached terminally to the polymer chain. Polymers containing only one terminal group, two terminal groups, or more than two terminal groups can be prepared within the scope of the invention.

The organo alkali metal initiators employed for preparing the polymers used in our invention can be represented by the formula $RM_x$ where R is a hydrocarbon radical selected from the group consisting of aliphatic, cycloaliphatic and aromatic radicals, M is an alkali metal including sodium, potassium, lithium, cesium, and rubidium and $x$ is an integer of from 1 to 4. The R in the formula generally contains from 1 to 20 carbon atoms although it is within the scope of the invention to use higher molecular weight compounds. By far the best results are obtained with organolithium compounds, which give very high conversions of monomer per unit weight of polymerization initiator. Examples of poly-alkali metal-substituted hydrocarbons which can be employed for the polymerization initiator include 1,4-dilithiobutane,
1,5-dipotassiopentane,
1,4-disodio-2-methylbutane,
1,10-dilithiodecane,
1,20-dilithioeicosane,
1,4-dilithio-2methyl-2-butene,
dilithionaphthalene,
dilithioanthracene,
1,2-dilithio-1,2-diphenylethane,
1,4-dilithiocyclohexane,
1,3,5-trilithiocyclohexane,
1,2-di(lithiobutyl)benzene,
1,3-dilithio-4-ethylbenzene,
1,4-dirubidiobutane,
1,8-dicesiooctane,
1,5-dilithio-3-pentyne,
1,10-dicesio-4-decyne,
dilithiopenanthrene,
dilithiomethane,
n-butyllithium,
amyllithium,
amylsodium,
cyclohexyllithium,
lithiobenzene,
methylcesium, and the like.

Certain specific initiators give better results than others and are preferred in carrying out preparation of the liquid diene polymers. Lithium adducts of naphthalene, methylnaphthalenes, and anthracene give very good results. A preferred initiator is 1,2 - dilithio - 1,2 - diphenylethane (lithium-stilbene adduct). Other preferred initiators for the formation of liquid diene polymers are the dilithium adducts of 2,3-dialkyl-1,3-butadiene, e.g., 2,3-dimethyl-1,3-butadiene, and especially the dilithium adduct of butadiene or isoprene wherein the adduct contains from 1 to 7 diene units per molecule. The amount of initiator which can be used will vary depending on the polymer prepared and particularly the molecular weight desired. Usually the initiator is used in amounts between about 0.25 and about 100 millimoles per 100 grams of monomer but will always be regulated to provide a liquid polymer.

Formation of the terminally reactive polymers is generally carried out in the range of between —100 and +150° C., preferably between —75 and +75° C. The particular temperature employed will depend on both the monomers and the initiators used in preparing the polymers. For example, it has been found that the organolithium initiators provide more favorable results at elevated temperatures whereas lower temperatures are required to effectively initiate a polymerization to the desired products with the other alkali metal compounds. It is preferred that the polymerization be carried out in the presence of a suitable diluent which is predominantly hydrocarbon, such as, benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. It should be understood that relatively small amounts of other materials can be present, such as the ethers in which the initiator was dissolved, or a polar compound which is charged to encourage random copolymerization.

The terminally reactive polymers prepared in accordance with the hereinbefore described processes contain an alkali metal atom on at least one end of the polymer chain and the organic radical of the initiator is present in the polymer chain. These terminally reactive polymers can be treated with reagents to introduce various reactive groups in place of the alkali metal atoms. The following equations represent examples of specific methods which can be employed to introduce reactive groups. In these equations A designates a polymer chain.

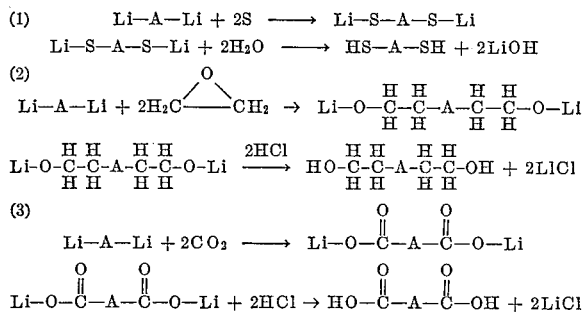

Examples of suitable reactive groups include —OH, —SH, —CS$_2$H, —POOH, —SOH, —SO$_2$H, —SO$_3$H, SCl, —COOH, —SeO$_2$H, —SeO$_3$H, —SnO$_2$H, —SbO$_2$H, —SbOH, SbO$_3$H, SiO$_2$H, —TeO$_2$H, —TeO$_3$H, —AsO$_2$H, —AsOH, —AsO$_3$H$_2$, —AsO$_3$H$_3$, and the like. The hydroxy and carboxy groups are presently preferred, with carboxy being the most preferred.

Some examples of reagents which can be employed to displace the terminal alkali metal atoms and place the aforedescribed and other reactive groups on the ends of the polymer chain are carbon dioxide, ethylene oxide, carbon disulfide, sulfur dioxide, sulfur, disodiumchlororesorcinate, chlorine, acetone, methyl ethyl ketone, phenyl methyl ketone, benzyl ethyl ketone, p-tolyl n-propyl ketone, acetyl chloride, propionyl chloride, butyryl bromide, benzoyl chloride, α-cyclohexylacetyl chloride, ethylacetate, methyl propionate, cyclohexyl butyrate, ethyl benzoate, phenyl acetate, p-tolyl propionate, 2-butenyl acetate, dimethyl formamide, dimethyl acetamide, diethyl benzamide, diphenyl formamide, diethyl 3-cyclohexylpropionamide, methyl chloromethyl ketone, propyl bromoethyl ketone, phenyl chlorophenyl ketone, cyclohexyl bromopropyl ketone, acetonitrile, propionitrile, butyronitrile, 2-cyclohexylacetonitrile, benzonitrile, p-methylbenzonitrile, ethyl isocyanide, n-butyl isocyanide, n-decyl isocyanide, 2 - (4 - methylcyclohexyl)ethyl isocyanide, methyl isocyanate, propyl isocyanate, phenyl isocyanate, benzyl isocyanate, p-tolyl isocyanate, n-pentyl isothiocyanate, 2-hexyl isothiocyanate, butenyl isothiocyanate, xylyl isothiocyanate, benzoquinone, 2-methylbenzoquinone, 4-bromocyclohexanone, ketene, ethylketene, phenylketene, cyclohexylketene, and the like.

In the production of carboxy terminated polymer, the solution from the polymerization reaction is contracted with carbon dioxide, by which means the alkali metal salt of a carboxylated polymer is formed. As a final step the product is treated with an acid to convert the alkali metal salt to the corresponding carboxylated polymer, after which the polymer is recovered and washed. In some instances, a small amount of solvent may be allowed to remain in the polymer, thus reducing viscosity. In the production of hydroxy terminated polymer, the solution from the polymerization reaction can be contacted with ethylene oxide to introduce oxygen into the polymer which is then contacted with a H$^+$ donor such as HCl to replace the Li with H, thus producing an OH end group.

Suitable fillers include high surface area fillers such as boron nitride and carbon black, and reactive fillers (basic reacting metal oxides) comprising the oxides of the metals selected from the group consisting of aluminum, magnesium, zinc, lead and tin. The high surface area fillers are materials having a surface area of at least 25 square meters per gram and are present in the calking compound in such an amount to provide at least 10 square meters of surface area of filler per gram of telechelic polymer, and preferably at least 20 square meters of surface area of filler per gram of telechelic polymer. The reactive fillers are frequently preferred because of the interaction of the metal oxide with the terminal groups of the polymer, thereby providing an integrated mass, eliminating failure of seal caused by separation of the liquid component of the calking compound from the remaining components, such as by adsorption of the liquid in wood or evaporation of the liquid. Of the reactive fillers, the presently preferred are zinc oxide, magnesium oxide, and aluminum oxide.

The amount of filler utilized will vary depending upon the particular filler utilized and the desired characteristics of the calking compound to be produced, but the amount of filler will generally be in the range of about 10 to about 600 parts by weight per 100 parts of telechelic polymer, and preferably in the range of about 25 to about 250 parts by weight per 100 parts of telechelic polymer. When the range of the filler is in the range of about 10 to about 150 parts by weight per 100 parts of telechelic polymer, it is preferred that a curing agent be added. High surface area fillers are chosen at the lower filler loadings in order to impart sufficient thixotropy to prevent flow of the compositions before they are cured.

Curatives which have been found to be effective are the aziridinyl compounds such as the triaziridinyl phosphine oxides or sulfides or the multifunctional aziridinyl-substituted triazines or triphosphatriazines, polyisocyanates, and polyepoxy compounds. Conventional curing agents can be employed as auxiliary curatives. Examples of such curatives include sulfur and sulfur compounds, peroxides such as benzoyl peroxide and dicumyl peroxide, and the like. Such curatives, if used, should be of a type and in an amount which will cure in the environment in which the composition is used, e.g., from the action of heat, ultraviolet radiation or atmospheric oxygen. Conventional dryers such as the metal naphthenates can be used to promote surface curing or hardening when desired.

The preferred polyaziridinyl compounds employed when the amount of basic metal oxide or other filler is at the lower levels are typified by the triaziridinyl phosphine oxides and sulfides which can be represented by the formula:

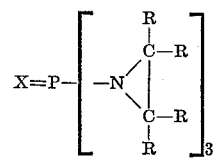

wherein X is selected from the group consisting of oxygen and sulfur, P is phosphorus, and each R is a radical selected from the group consisting of hydrogen, alkyl, cycloalkyl and aryl radicals and composites thereof such as alkaryl, aralkyl and the like and the total R's of each aziridinyl group containing up to a total of 20 carbon atoms. Specific phosphine oxide and sulfide reactants which can be used include: tri(1-aziridinyl)phosphine oxide, tri(2-methyl-1-aziridinyl)phosphine oxide, tri(2,2-dimethyl-1-aziridinyl)phosphine oxide, tri(2-methyl-3-ethyl-1-aziridinyl)phosphine oxide, tri(2-methyl-3-decyl-1-aziridinyl)phosphine oxide, tri(2-eicosyl - 1 - aziridinyl) phosphine oxide, tri(2-methyl - 3 - cyclopentyl - 1 - aziridinyl)phosphine oxide, tri(2-phenyl-1-aziridinyl)phosphine oxide, tri[2-ethyl-3-(1-naphthyl)1-aziridinyl]phosphine oxide, tri(2-nonyl - 3 - benzyl - 1 - aziridinyl)phosphine oxide, tri[2 - n - propyl - 3 - (2-phenylethyl)1-aziridinyl]phosphine oxide, tri[2-heptyl - 3 - (2,4-dimethylphenyl)1 - aziridinyl]phosphine oxide, tri(2 - methyl-1-aziridinyl)phosphine sulfide, tri(2-methyl-3-cyclohexyl-1-aziridinyl)phosphine sulfide, tri(2-phenyl - 1 - aziridinyl) phosphine sulfide, and tri(2-amyl-3-benzyl-1-aziridinyl)-phosphine sulfide.

Examples of other polyfunctional aziridinyl compounds are the aziridinyl-substituted triazines and triphosphatriazines, for example, the 1-aziridinyl-1,3,5-triazines and the 1-aziridinyl-2,4,6-triphospha-1,3,5-triazines represented by the formulas:

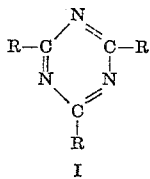 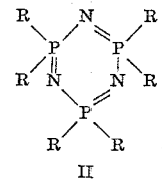

I II wherein each R is a radical at least two of which in each formula are 1-aziridinyl radicals as defined above for the phosphine oxides and sulfides and the remainder are selected from the group consisting of said 1-aziridinyl radicals, hydrogen, alkyl, cycloalkyl and aryl radicals and compositions thereof, each hydrocarbon radical containing from 1 to 12 carbon atoms.

Examples of compounds represented by Formula I include the following: 2,4-di(1-aziridinyl)1,3,5-triazine, 2-methyl - 4,6 - di(1 - aziridinyl)1,3,5 - triazine, 2,4,6-tri(1-aziridinyl)1,3,5 - triazine, 2,4,6-tri(2-methyl-1-aziridinyl) 1,3,5-triazine, 2,4,6-tri(2-methyl - 3-ethyl - 1-aziridinyl) 1,3,5-triazine, 2,4,6-tri-(2-ethyl-3-octadecyl - 1-aziridinyl) 1,3,5-triazine, 2,4,6-tri(2-methyl - 3-cyclopentyl - 1-aziridinyl)1,3,5-triazine, 2,4,6-tri(2-phenyl - 1-aziridinyl)1,3,-5-triazine, 2,4,6 - tri(2,3-diphenyl - 1-aziridinyl)1,3,5-triazine, 2,4,6-tri(2-n-propyl - 3-(2-phenylethyl)1-aziridinyl)1,3,5-triazine, 2,4,6-tri(2-methyl - 3-(4-methylphenyl) 1-aziridinyl)1,3,5-triazine and the like.

Examples of compounds represented by Formula II are: 2,4-di(1-aziridinyl)2,4,6-triphospha - 1,3,5-triazine, 2,4,6 - tri(1-aziridinyl)2,4,6-triphospha - 1,3,5-triazine, 2,4,6 - tri(2 - methyl - 3-n-butyl - 1 - aziridinyl)2,4,6-triphospha - 1,3,5-triazine, 2,4,6-tri(2-ethyl - 3-cyclohexyl-1-aziridinyl)2,4,6-triphospha - 1,3,5-triazine, 2,4,6-tri(2-n-propyl - 3-(2-phenylethyl)1-aziridinyl)-2,4,6-triphospha-1,3,5-triazine, 2,4,6-tri(2-heptyl - 3-(2,4-dimethylphenyl) 1-aziridinyl)2,4,6-triphospha - 1,3,5-triazine, 2,2,4,4,6,6-hexa(2-methyl - 1-aziridinyl)2,4,6-triphospha - 1,3,5-triazine, hereinafter referred to as hexa-2-methyl-1-aziridinyltriphosphatriazine, 2,2,4,4,6-tetra(2-hexyl - 1-aziridinyl)2,4,6-triphospha-1,3,5-triazine and the like.

Other difunctional aziridinyl compounds which can be employed are defined by the formula:

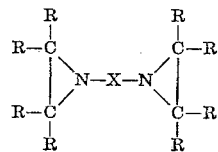

wherein X is selected from the group consisting of carbonyl, phenyl phosphoryl, phenyl thiophosphoryl, sulfoxyl or sulfonyl and each R is as defined above for the aziridinyl radical of the phosphine oxides. In a preferred species X is phenyl phosphoryl or sulfoxyl attached to (2-methyl - 1-aziridinyl) groups. Examples of these difunctional aziridinyl compounds are: phenyl-bis(2-methyl-1-aziridinyl)phosphine sulfide, phenyl-bis(2-methyl - 1-aziridinyl)phosphine oxide, phenyl-bis(2-ethyl - 1-aziridinyl) phosphine oxide, phenyl-bis(2-methyl-3-ethyl - 1-aziridinyl)phosphine oxide, phenyl-bis(2-butyl - 1 - aziridinyl) phosphine oxide, bis(2-methyl-1-aziridinyl)sulfoxide, bis (2-propyl - 1-aziridinyl)sulfoxide, bis(2-methyl-3-propyl-1-aziridinyl)sulfoxide, (2-methyl - 1-aziridinyl-2-butyl-1-aziridinyl)sulfoxide, bis(1-aziridinyl)sulfone, bis(2-methyl-1-aziridinyl)sulfone, bis(2-ethyl - 1-aziridinyl)sulfone, bis(2-propyl - 1-aziridinyl)sulfone, bis(2-ethyl - 3-propyl-1-aziridinyl)sulfone, (2-methyl - 1-aziridinyl - 2-ethyl-1-aziridinyl)sulfone, bis(1,2-propylene) - 1,3-urea, bis(1,2-pentylene) - 1,3 - urea, bis(4,5-octylene) - 1,3-urea and the like.

The preferred curing agents for hydroxy terminated polymers include polyisocyanates, e.g., benzene-1,3-diisocyanate, benzene - 1,4-diisocyanate, hexane-1,6-diisocyanate, toluene - 2,4-diisocyanate, toluene-3,4-diisocyanate, diphenylmethane - 4,5-diisocyanate, naphthalene - 1,5-diisocyanate, butane - 1,4-diisocyanate, benzene - 1,2,4-triisocyanate, naphthalene - 1,3,5,7-tetraisocyanate, and the like.

Epoxy compounds having the formulas:

1. 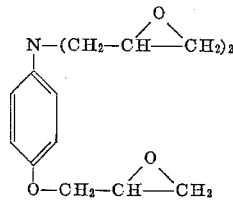

2. 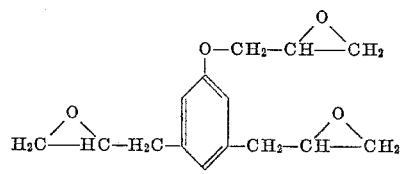

are suitable curatives for carboxy terminated polymers. The compound of Formula 1 is avaialable from Union Carbide under the designation ERL-0500 while the compound of Formula 2 is available from Shell under the designation Epon Resin X-801. An accelerator such as a tertiary amine is usually utilized when the Shell compound is employed as curative. The epoxy curatives are particularly desirable where increased adhesiveness of the polymeric material is desired.

The quantity of the curvative employed is generally in the range of about 0.5 to about 10 equivalents, preferably in the range of about 0.9 to about 6 equivalents, based on the functional groups in the polymer.

In another embodiment of the invention, the calking compositions can be prepared using an amount of the reacting filler and/or high surface area filler in the lower part of the above range and a low surface area inert filler such as titanium dioxide, calcium carbonate, or diatomaceous earth, can be combined therewith. When so operating sufficient amounts of the reacting filler and/or high surface area filler are provided to realize its advantages. In another embodiment of the invention, the calking compositions can be prepared by admixing a liquid telechelic polymer, a suitable filler and a liquid plasticizer. A suitable curative, for example one of the aziridinyl compounds, polyepoxides, or polyisocyanates previously discussed, can then be added to effect a curing of the composition. In prior practice plasticizer and/or extender oils have been employed in compounding solid, high Mooney rubbery polymers. Relatively large quantities of extender oils can be used to improve the processability of tough or high Mooney rubbers without producing deleterious effects on the vulcanizates. As the Mooney value of a rubber decreases, smaller amounts of plasticizer are generally employed in the compounding recipe in order that the properties of the rubber will not be impaired. It would, therefore, not appear feasible to incorporate a plasticizer or extender oil into a liquid polymer composition.

Contrary to expectations, very surprising results have now been found when a reinforcing filler and a plasticizer oil, together with a suitable curative, are added to a liquid telechelic polymer and the composition cured. The products are elastomeric and have unexpectedly high tensile strength, good elongation, and range from soft to tough rubbers, depending upon the proportions of filler, plasticizer, curing agent, and liquid polymer. Cured compositions with tensile strength above 300 p.s.i. high elongation, and medium hardness can be prepared when the liquid telechelic polymer content is as low as 14 or 15 weight percent of the total composition. Other rubbery compositions with tensile strengths around 2000 p.s.i. can be prepared from compositions that contain less than 50 weight percent of liquid telechelic polymer, based on the total original composition.

The presence of a plasticizer together with substantial amounts of filler in the uncured compositions of this invention increases extrudability while maintaining thixotropy, both factors of considerable importance in sealants and calking compounds, applications for which the products herein described are suitable. The elastomeric character of the cured compositions, i.e., good tensile strength and elongation, of the very highly loaded stocks, makes them superior to many of the calking and sealant compositions heretofore employed. Furthermore the compositions are inexpensive to prepare.

Reinforcing fillers employed in the plasticizer extended compositions include the various types of carbon black, e.g., furnace black, channel black, thermal black, and gas black, and mineral fillers such as silica, clays, titanium dioxide, alumina, magnesia, zinc oxide, and calcium carbonate.

Plasticizers which can be utilized include esters, aromatic oils, liquid petroleum oils, chlorinated hydrocarbons such as chlorinated biphenyls and terphenyls, vegetable oils, pine oils, tall oil, and the like. Chlorinated hydrocarbons are of particular interest in sealant and calking compositions on account of the improvement in adhesiveness obtained through their use.

Materials found to be most effective as curatives for plasticizer extended compositions prepared from carboxy-terminated polymers are the aziridinyl compounds such as the triaziridinyl-phosphine oxides and sulfides and the multifunctional aziridinyl-substituted triazines and triphosphatriazines, and polyepoxides. Effective curing agents for plasticizer extended hydroxy-terminated polymers are the polyisocyanates.

The amount of filler utilized in plasticizer extended liquid telechelic polymer compositions can vary within fairly broad limits depending upon the type of product desired. It will generally be in the range from about 10 to 600 parts by weight per 100 parts liquid telechelic polymer, although larger amounts can be used if desired.

The quantity of liquid plasticizer employed is generally in the range from about 80 to 300 parts by weight per 100 parts liquid telechelic polymer and will be governed by the type and amount of filler as well as the type of product desired.

The ratio of filler to plasticizer in parts by weight is generally in the range from 0.2:1 to 40:1.

The quantity of curative in plasticizer extended liquid telechelic polymer compositions will ordinarily be in the range of 0.5 to 10 equivalents, preferably in the range of about 1 to 6 equivalents, based on the functional groups in the polymer.

The telechelic polymers which are suitable for use in the invention are liquid and have an inherent viscosity within the range of about 0.10 to about 0.80, and preferably in the range of about 0.15 to about 0.40. The inherent viscosities of the polymerization products were determined by placing one tenth gram of polymer in a wire cage made from 80 mesh screen and placing the wire cage in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

The calking compositions of the invention can be utilized in conventional applications of calking compounds. The calking compounds of the invention wherein the level of the filler is less than 100 parts of filler per 100 parts of telechelic polymer, and preferably less than 80 parts of filler per 100 parts of telechelic polymer are particularly useful as windshield sealants because of the elastic properties thereof.

A suitable adhesive can be applied to one or more of the surfaces to which the calking composition is to be applied to improve the adhesion of the calking composition to the surface. Adhesives which have been found to be useful include Chemlok 203 and 220, and Chemlok 607, manufactured by Hughson Chemical Company.

When preparing the compositions herein described, the liquid polymeric component is blended with the thixotropic agent (and the plasticizer, where appropriate) on a roll mill, in a sigma mixer, a pug mill, or other similar device, such mixing being done at ambient temperature for sufficient time to secure an intimate dispersion of the thixotropic agent in the liquid polymer. The curing agent can be added immediately prior to use, if desired, and the composition applied to the desired area. Curing begins immediately but is not so rapid as to hinder satisfactory application of the material. It takes place gradually at room temperature and more rapidly at elevated temperature giving compositions which are tough and elastomeric in character and which remain resilient thereby adjusting to vibration, thermal expansion, or other structural variation without cracking or pulling away from the surfaces to which it is applied. These compositions adhere strongly to glass, wood, metal, and other hard, non-porous surfaces.

In some instances, it may be desirable to incorporate an antioxidant in the composition by which means internal hardening can be prevented, thus enhancing flexibility. Examples of such antioxidants include phenyl-β-naphthylamine, 2,2'-methylene-bis(4-methyl-6-tert-butylphenol) and the like.

The following examples are presented in illustration of the invention but are not to be construed as limiting the invention.

EXAMPLE I

A liquid carboxy-telechelic polybutadiene was prepared according to the following recipe:

| | |
|---|---|
| 1,3-butadiene _____parts by weight__ | 100 |
| Cyclohexane _____do____ | 1000 |
| Lithium-methylnaphthalene-isoprene initiator millimoles__ | 20 |
| Temperature _____° F__ | 122 |
| Time _____hours__ | 1.5 |
| Conversion, quantitative. | |

The initiator had been prepared by reacting isoprene, methylnaphthalene (a commercial mixture of alpha- and beta-methylnaphthalenes), and lithium in ether using the following proportions of ingredients:

| | |
|---|---|
| Methylnaphthalene (14.2 ml.) grams | 14.2 |
| Isoprene (10.0 ml.) do | 6.6 |
| Lithium wire do | 2.2 |
| Diethyl ether ml | 47.2 |
| Temperature ° F | −15 |
| Time hours | 40 |

To the reaction mixture was added 4 moles of butadiene per mole of initiator to effect solubilization. The amount of butadiene was calculated from the normality of the reaction mixture which was determined by withdrawing a sample and titrating it with 0.1 N hydrochloric acid.

Immediately following the polymerization the unquenched reaction mixture was carbonated using a T-tube. Carbon dioxide, under a pressure of 15–18 p.s.i.g., and the polymer solution were fed into separated arms of the tube where they were admixed. The carbonated polymer solution was acidified with a hydrochloric acid-isopropyl alcohol mixture and washed with water until neutral. The major portion of the solvent was removed under vacuum and the remainder by purging with nitrogen.

Polymers made in this manner were used in the following examples.

EXAMPLE II

A series of runs was made to determine the effect of various metal oxides on the thixotropic properties of calking compositions made from carboxy-terminated liquid polybutadiene. In these runs, 50/50 mixtures of the metal oxide and carboxy-terminated liquid polymer were prepared. From each mixture a 5-gram sample was taken and applied to a glass plate situated at an angle of 65 degrees from the horizontal. The time for the sample to flow one inch on the glass was recorded. Data on these runs are shown in Table I.

TABLE I

| Metal oxide: | Time (minutes) |
|---|---|
| MgO | No flow in 2 hours |
| Al$_2$O$_3$ | No flow in 2 hours |
| ZnO | 34.9 |
| TiO$_2$ | 1.7 |
| Dixie clay | 2.9 |
| None | 0.13 |

These data show that the basic reacting metal oxides effectively prevent flow, i.e., are thixotropic, while non-reactive materials are substantially ineffective at the same loading.

EXAMPLE III

A series of mixtures of liquid carboxy-terminated polybutadiene with zinc oxide was prepared, the ratio of metal oxide to polymer varying from 1:1 to 6:1. The products were highly thixotropic in all runs. On exposure to air, a firming of the surface was observed while within the mass the material remained resilient and rubber-like.

Samples from these mixes, when used for calking joints in metals, glass, wood, concrete, or between each of these and another, made satisfactory seals that did not flow over extended periods when placed in vertical position. Surface firming occurred in each instance to provide smooth, dust free seals.

EXAMPLE IV

A series of compositions was prepared using carboxy-terminated liquid polymers as shown below:

| | 1 | 2 | 3 | 4 |
|---|---|---|---|---|
| Liquid polymer | 5 | 5 | 5 | 5 |
| Zinc oxide | 5 | 10 | 20 | 30 |
| 6% cobalt naphthenate | 0.5 | 0.5 | 0.5 | 0.5 |

After seven months' exposure of these compositions to out-of-doors weathering conditions, all four samples had formed a tough outer "skin." Numbers 1 and 2 had tacky, rubbery interiors; Number 3 was stiff throughout but somewhat rubbery within; and Number 4 was hard throughout.

EXAMPLE V

A series of compositions was prepared using carboxy-terminated liquid polymers as shown below:

| | 1 | 2 | 3 |
|---|---|---|---|
| Liquid polymer | 5 | 5 | 5 |
| Zinc oxide | 20 | 20 | 20 |
| PBNA | | 0.1 | |
| AO-2246 | | | 0.1 |

These compositions were exposed to out-of-doors weathering conditions for six months. All developed hard outer surfaces. Number 1 was hard throughout while Numbers 2 and 3 were soft and pliable within.

PBNA is phenyl-β-naphthylamine, a well known and widely used antioxidant for rubber. AO–2246 is 2,2′-methylene-bis(4-methyl-6-tert-butylphenol), also a well known antioxidant material. In the absence of the antioxidant material, the compositions develop internal hardness while in the presence of the antioxidant material, only the outer surfaces were hardened.

EXAMPLE VI

The following compositions were prepared using the liquid carboxy-telechelic polybutadiene described in Example I:

TABLE II

| | 1 | 2 | 3 | 4 |
|---|---|---|---|---|
| Carboxy-telechelic polymer | 100 | 100 | 100 | 100 |
| Gamma-alumina | 25 | 25 | 35 | 35 |
| Dixie Clay [1] | 25 | 25 | | |
| HMAT,[2] equivalents | | 1.1 | | 1.1 |

[1] A hard-type, white-to-cream colored kaolin mineral filler (aluminum silicate).
[2] Hexa(2-methyl-1-aziridinyl)triphospha-1,3,5-triazine.

Each of the above compositions was prepared by blending the ingredients on a roll mill at room temperature.

Ten-gram spherical samples of the products from runs 1 and 3 were pressed against an inclined plane at an angle of 75 degrees. They were substantially non-flowing as evidenced by very little, if any, change after remaining in this position three weeks at room temperature.

Products from runs 2 and 4 were cured at room temperature and also at 55° C. Curing began immediately following incorporation of the hexa(2-methyl-1-aziridinyl) triphospha-1,3,5-triazine. The products were tough, elastomeric compositions, were non-flowing, and were strongly adherent to glass. They also display strong adherence to wood, metal, and other hard, non-porous surfaces.

EXAMPLE VII

The liquid carboxy-telechelic polymer described in Example I was employed for the preparation of a series of sealant compositions in which the filler was varied. Materials utilized for this purpose, and also as thixotropic agents, were boron nitride, gamma alumina, and high abrasion furnace black. Polyepoxy curing agents were employed except in the boron nitride composition and an amine accelerator was present in addition to the curative in three of the runs. The several sealants were prepared by blending the ingredients on a roll mill at room temperature. The runs are summarized in Table III.

TABLE III

|  | 1 | 2 | 3 | 4 | 5 | 6 | 7 | 8 | 9 |
|---|---|---|---|---|---|---|---|---|---|
| Liquid carboxytelechelic polymer, parts by weight | 100 | 100 | 100 | 100 | 100 | 100 | 100 | 100 | 100 |
| Gamma alumina, parts by weight | 35 | 35 | 35 | 35 |  |  |  | 25 | 25 |
| High abrasion furnace black, parts by weight |  |  |  |  | 50 | 50 |  |  |  |
| Boron nitride, parts by weight |  |  |  |  |  |  | 50 |  |  |
| ERL-0500,[1] equivalents (based on functional groups in polymer) | 1.36 | 2.72 | 4.08 | 5.44 | 2.72 | 2.72 |  | 1.36 |  |
| Epon Resin X-801,[2] equivalents (based on functional groups in polymer) |  |  |  |  |  |  |  |  | 1.44 |
| Dimethylbenzylamine, parts by weight |  |  |  |  | 0.5 |  |  | 0.5 | 0.5 |
| Cured at 180° F., hours |  |  |  |  | 72 | 72 |  | 88.5 | 88.5 |
| Tensile, p.s.i. |  |  |  |  | 810 | 350 |  | 690 | 670 |
| Elongation, percent |  |  |  |  | 80 | 50 |  | 400 | 630 |

[1] A polyepoxy compound with the formula

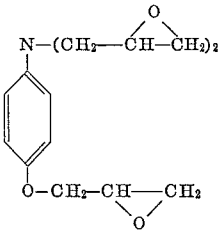

(Union Carbide)

[2] A polyepoxy compound with the formula

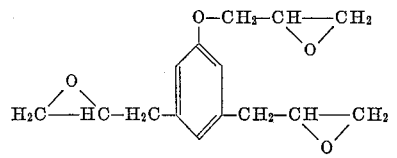

(Shell)

No flow was exhibited in any of the compositions. The first four materials cured to a soft consistency after standing 24 hours at 122° F. and after 10 days a significant increase in hardness was observed. The composition from run 7 gave a reasonably good cure after standing at room temperature for 24 hours. The materials in runs 5, 6, 8, and 9 were cured at 180° F. and physical properties determined. Tensile strength and elongation were better in run 5 containing the amine accelerator than they were in run 6.

EXAMPLE VIII

A series of compositions was prepared from liquid carboxy-telechelic polybutadiene described in Example I using different types and amounts of carbon black as reinforcing fillers and also different types and amounts of plasticizers. Curatives employed were of the aziridinyl and polyepoxy types. The compositions were cured for variable periods at temperatures ranging from 120 to 250° F.

The runs are summarized in Table IV. Two control runs without plasticizer are included at the end of the table.

A study of the data shows that several of the compositions containing similar amounts of filler have tensile strengths as high or higher than the control and also higher elongations. All cured compositions containing both filler and plasticizer were elastomeric while the controls were brittle and broke readily when bent. Cured compositions varying from very soft to reasonably hard with variable tensile strength and elongation can be prepared by varying the type and amount of filler and plasticizer as well as the curing conditions.

TABLE IV

| Run No. | Filler Type | Filler Phr. | Plasticizer Type | Plasticizer Phr. | Filler:Plast., wt. ratio | Polymer in Compn., wt. percent[1] | Curative[2] Equiv.[3] | Cure Time, hrs. | Cure Temp., °F. | Tensile, p.s.i. | Elong., percent | Shore Hardness[4] |
|---|---|---|---|---|---|---|---|---|---|---|---|---|
| 1 | A[5] | 90 | B[6] | 80 | 1.1:1 | 37.0 | 1.9 | 240 | 120 | 1,410 | 80 | 36 |
| 2 | A[5] | 120 | B[6] | 140 | 0.86:1 | 27.8 | 2.55 | 16 | 150 | 970 | 225 | 32 |
| 3 | A[5] | 120 | B[6] | 140 | 0.86:1 | 27.8 | 2.55 | 240 | 120 | 1,055 | 85 |  |
| 4 | A[5] | 150 | B[6] | 200 | 0.75:1 | 22.2 | 2.55 | 240 | 120 | 1,390 | 90 | 15 |
| 5 | A[5] | 50 | B[6] | 200 | 0.25:1 | 28.6 | 1.9 | 16 | 150 | 235 | 355 | 5 |
| 6 | A[5] | 50 | B[6] | 200 | 0.25:1 | 28.6 | 1.9 | 240 | 120 | 320 | 190 |  |
| 7 | A[5] | 80 | B[6] | 140 | 0.57:1 | 31.2 | 2.55 | 16 | 150 | 610 | 295 | 18 |
| 8 | A[5] | 80 | B[6] | 140 | 0.57:1 | 31.2 | 2.55 | 240 | 120 | 800 | 120 |  |
| 9 | A[5] | 100 | B[6] | 200 | 0.5:1 | 25.0 | 2.55 | 1 | 250 | 490 | 270 | 28 |
| 10 | A[5] | 100 | B[6] | 200 | 0.5:1 | 25.0 | 2.55 | 240 | 120 | 550 | 120 |  |
| 11 | C[7] | 120 | B[6] | 140 | 0.86:1 | 27.8 | 2.55 | 1 | 250 | 180 | 250 | 18 |
| 12 | C[7] | 400 | B[6] | 200 | 2:1 | 14.3 | 2.55 | 1 | 250 | 315 | 225 | 25 |
| 13 | D[8] | 90 | B[6] | 80 | 1.1:1 | 37.0 | 2.55 | 1 | 250 | 510 | 205 | 39 |
| 14 | D[8] | 120 | B[6] | 140 | 0.86:1 | 27.8 | 2.55 | 1 | 250 | 525 | 270 | 31 |
| 15 | D[8] | 150 | B[6] | 200 | 0.75:1 | 22.2 | 2.55 | 1 | 250 | 320 | 220 | 24 |
| 16 | D[8] | 100 | B[6] | 200 | 0.5:1 | 25.0 | 2.55 | 16 | 150 | 255 | 320 | 19 |
| 17 | E[9] | 120 | B[6] | 140 | 0.86:1 | 27.8 | 2.55 | 16 | 150 | 1,080 | 180 | 52 |
| 18 | E[9] | 150 | B[6] | 200 | 0.75:1 | 22.2 | 2.55 | 16 | 150 | 500 | 150 | 50 |
| 19 | E[9] | 100 | B[6] | 200 | 0.5:1 | 25.0 | 2.55 | 16 | 150 | 470 | 185 | 34 |
| 20 | A[5] | 90 | F[10] | 80 | 1.1:1 | 37.0 | 2.55 | 1 | 250 | 1,490 | 105 |  |
| 21 | A[5] | 90 | G[11] | 80 | 1.1:1 | 37.0 | 2.55 | 1 | 250 | 1,350 | 75 |  |
| Control Runs: |  |  |  |  |  |  |  |  |  |  |  |  |
| 22 | A[5] | 100 |  |  |  | 50.0 | 1.9 | 1 | 250 | 1,630 | 50 |  |
| 23 | E[9] | 100 |  |  |  | 50.0 | 1.9 | 1 | 250 | 1,530 | 60 |  |

[1] Based on filler, plasticizer, and polymer.
[2] The curative utilized in each run was 2,2,4,4,6,6-hexa(2-methyl-1-aziridinyl)-2,4,6-triphosphatriazine.
[3] Based on carboxy content of polymer.
[4] Samples cured 16 hours at 150° F.
[5] Philblack 0, a high abrasion furnace black.
[6] Philrich 5, an aromatic oil.
[7] Thermax, medium thermal black.
[8] Gastex, semi-reinforcing gas black.
[9] Wyex, easy-processing channel black.
[10] Aroclor 1242, chlorinated polyphenyl compositions: Distillation range, ° C., 325–360; Saybolt Universal Viscosity at 100° F., sec. 80–93; refractive index at 20° C., 1.627–1.629; appearance, colorless, mobile oil.
[11] Aroclor 1254, chlorinated polyphenyl compositions: Distillation range, ° C., 365–390; Saybolt Universal Viscosity at 100° F., sec., 1,800–2,500; refractive index at 20° C., 1.639–1.641; appearance, light yellow viscous oil.

EXAMPLE IX

The carboxy-telechelic polymer employed in Example I was utilized in preparing the following composition:

| | Parts by weight |
|---|---|
| Carboxy-telechelic polymer | 100 |
| Gamma-alumina | 35 |
| Aroclor 1242 | 20 |
| Dimethylbenzylamine | 0.5 |
| Epon Resin X-801 | [1] 10 |
| Filler: plasticizer weight ratio | 1.75:1 |
| Polymer in composition, wt. percent | 64.5 |

[1] 2.87 equivalents.

The polymer composition was tested for adhesiveness to metal using the lap joint technique. The joint was prepared from 0.010-inch mild steel strips one inch wide with a one-inch overlap. The composition was applied to a thickness of ⅛ inch. The joint was cured 16 hours at 250° F. The joint strength (in shear) was 350 p.s.i. Good adhesion of polymer composition to metal was obtained. Failure occurred within the polymer. When a hydrocarbon plasticizer is used instead of a chlorinated polyphenyl, the metal-to-polymer bond is not nearly so strong and failure generally occurs at the polymer-metal interface.

Reasonable variation and modification are possible within the scope of the foregoing disclosure and the appended claims.

We claim:

1. A composition comprising an admixture of (A) a liquid polymeric material having the formula

HOOC—R—COOH wherein R is a divalent hydrocarbon radical selected from the group consisting of homopolymers of conjugated dienes, copolymers of at least two conjugated dienes, and copolymers of at least one conjugated diene with a minor amount of a material selected from the group consisting of vinyl-substituted aromatic compounds, vinylpyridines, vinylquinolines in which the vinyl group is attached to a ring carbon other than a carbon in the beta position with respect to the nitrogen, polymerizable nitriles, and N,N-disubstituted amides and (B) boron nitride.

2. The composition of claim 1 wherein said polymer is a polymer of a conjugated diene having 4 to 12 carbon atoms per molecule.

3. The composition of claim 1 wherein said polymer is a carboxy-terminated polybutadiene.

4. The composition of claim 1 wherein the amount of said boron nitride is in the range of about 10 to about 600 parts by weight per 100 parts of said polymer.

5. The composition according to claim 1, wherein the amount of said boron nitride is in the range of about 10 to about 150 parts by weight per 100 parts of said polymer, further comprising an aziridinyl compound or a polyepoxy compound as an auxiliary curing agent, the amount of said auxiliary curing agent being in the range of about 0.5 to about 10 equivalents based on the functional groups in said polymer.

6. A composition comprising an admixture of a liquid, carboxy-terminated polymer of a conjugated diene having 4 to 12 carbon atoms per molecule, boron nitride in an amount in the range of about 10 to about 600 parts by weight per 100 parts of said polymer, and an aziridinyl compound or a polyepoxy compound in an amount in the range of about 0.5 to 10 equivalents based on the functional groups in said polymer.

7. The composition according to claim 6 wherein said polymer is a carboxy-terminated polybutadiene.

References Cited

UNITED STATES PATENTS

| | | | |
|---|---|---|---|
| 2,649,439 | 8/1953 | Brown | 260—89.5 |
| 2,849,426 | 8/1958 | Miller | 260—79.5 |
| 3,005,802 | 10/1961 | Sellers | 260—78.5 |
| 3,074,917 | 1/1963 | Reynolds | 260—94.7 |
| 3,097,193 | 7/1963 | Gruver | 260—85.1 |
| 3,108,994 | 10/1963 | Zelenski et al. | 260—94.7 |
| 3,135,716 | 6/1964 | Uraneck et al. | 260—94.7 |
| 3,159,587 | 12/1964 | Uraneck et al. | 260—94.2 |
| 3,178,389 | 4/1965 | Hallenbeck | 260—41.5 |
| 3,214,421 | 10/1965 | Mahan | 260—94.7 |
| 3,232,895 | 2/1966 | Klein et al. | 260—33.8 |

MORRIS LIEBMAN, *Primary Examiner.*

A. H. KOECKERT, *Assistant Examiner.*